United States Patent

Lake et al.

[15] 3,662,461
[45] May 16, 1972

[54] METHOD OF MAKING DRY INSULATED INDUCTIVE COIL

[72] Inventors: Glen W. Lake, Greensboro, N.C.; Myron D. Coerper, Charlottesville, Va.

[73] Assignee: Chemetron Corporation, Chicago, Ill.

[22] Filed: May 4, 1970

[21] Appl. No.: 34,110

Related U.S. Application Data

[62] Division of Ser. No. 780,355, Dec. 2, 1968.

[52] U.S. Cl. ...........................29/605, 174/120, 174/121.4, 174/DIG. 8, 336/205, 336/206
[51] Int. Cl. ...........................................................H01f 7/06
[58] Field of Search ...................29/602, 605; 336/205, 206, 336/192, 96, 182; 174/121.4, 120, 73, DIG. 8

[56] References Cited

UNITED STATES PATENTS

| | | | |
|---|---|---|---|
| 3,339,162 | 8/1967 | Burnsteel et al. | 29/605 X |
| 3,297,970 | 1/1967 | Jones | 336/205 |
| 3,317,655 | 5/1967 | Oatess et al. | 174/73 |
| 3,464,109 | 9/1969 | Parker | 29/605 |
| 3,555,670 | 1/1971 | Zickar et al. | 29/605 |
| 3,048,651 | 8/1962 | Howard et al. | 174/120 |
| 3,071,845 | 1/1963 | Leonard et al. | 29/605 |
| 3,263,196 | 7/1966 | Reber | 336/96 |

Primary Examiner—John F. Campbell
Assistant Examiner—Carl E. Hall
Attorney—James E. Nilles

[57] ABSTRACT

A high voltage dry-insulated transformer includes a primary coil having a multiple turn, multiple layer winding constructed by alternately winding a coil layer and then insulation sheets or tape on a winding form. The insulation sheet is a non-woven glass filament cloth which is impregnated with a semi-cured epoxy resin. A plurality of insulating cloth layers are wrapped about the primary coil to define the necessary intercoil insulation. The secondary coil is then similarly formed. The interlayer and intercoil insulating cloth extends beyond the axial end faces of the coils and the space is filled by wrapping of a corresponding tape between the two extended layers. The cloth is applied under tension and heat and the exterior of each layer is rolled to exclude air and cause the resin to flow into the voids and crevices. After the formation of each coil or coils, the assembly is cured by heating under pressure and vacuum. The exterior is wrapped with a shrink type Mylar and the ends of the assembly are capped to confine the insulating resin during the curing and processing cycle.

10 Claims, 7 Drawing Figures

PATENTED MAY 16 1972

Inventors:
G. W. Lake
M. D. Coerper
By: James E. Nilles
Attorney

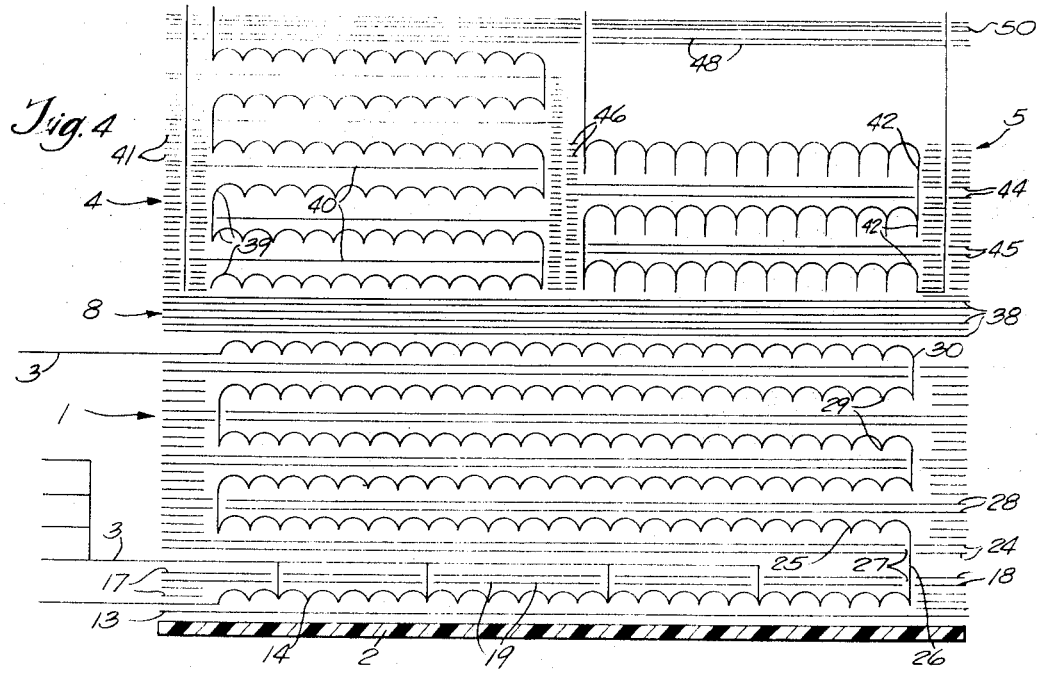
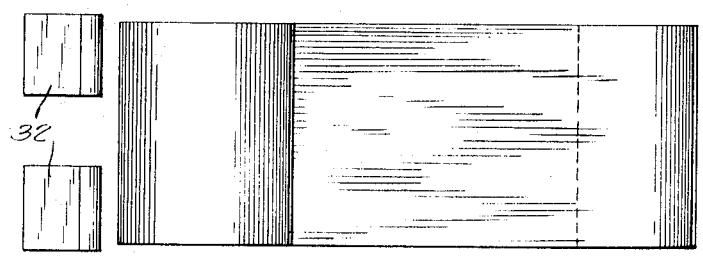
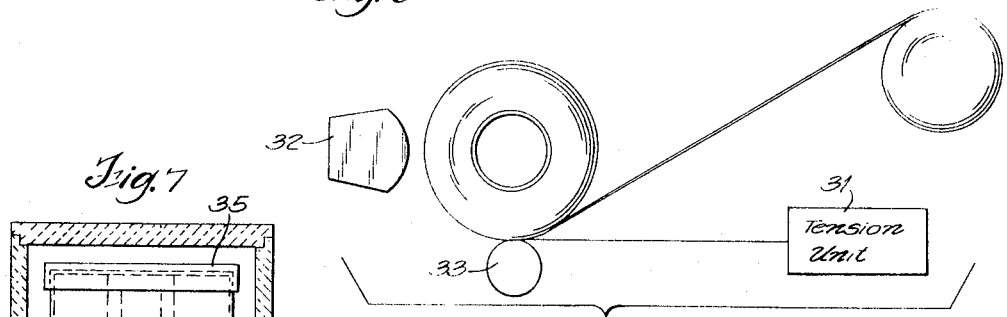
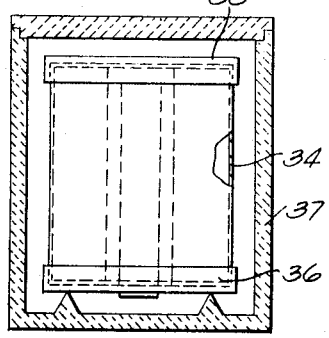

3,662,461

METHOD OF MAKING DRY INSULATED INDUCTIVE COIL

CROSS REFERENCE TO RELATED APPLICATION

This application is a divisional application of the co-pending U.S. Ser. No. 780,355, filed Dec. 2, 1968 and entitled "Dry Insulated Inductive Coil and Method of Making the Same" from which a continuation application, Ser. No. 67,288 was filed on Aug. 26, 1970.

BACKGROUND OF THE INVENTION

This invention relates to the method of making an inductive coil and more particularly to the method of making a high voltage dry-insulated inductive coil unit of a high voltage transformer.

High voltage coils and transformers require special insulating techniques because of the detrimental effects arising in the presence of air, moisture, as well as other foreign and contaminating material in the operating environment. Although oil immersed coils provide certain operating advantages, dry insulated and encapsulated transformer and other inductive coils have substantial advantages from the standpoint of handling and the like. However, dry type insulation must be specially formed and special considerations taken to avoid the adverse effects associated with Corona. Void or foreign material in the coil insulation traps air within the insulation which is subject to a voltage difference. If the voltage gradient is sufficiently high, actual ionization of the air and spark over may occur. This results in rapid deterioration of the insulating characteristic of the insulation and eventually results in a disruption or breakdown thereof. Some high voltage transformers and other inductive coils of the dry type insulation have been formed by encapsulating or potting of the coil with a suitable resin after the coil is wound. Such coils, however, have been found to have severe limitations both as to the physical size and the voltage applications because of entrapment of air within the insulation.

SUMMARY OF THE INVENTION

The present invention is particularly directed to the method of making a high voltage induction coil practically without limitation as to the physical size and voltage capability.

Generally, in accordance with the present invention, the high voltage coil is constructed by winding insulation about the turns of the coil during the winding of the coil. The insulation is a non-woven cloth which is impregnated with an electrically insulating resin preferably a semi-cured epoxy resin or the like. The insulating cloth layers are wrapped to define the necessary interlayer insulation and where a number of coils are disposed in superimposed relationship such as in a transformer to form the necessary intercoil relationship. Free resin may be applied to the insulating material during winding if a larger amount of resin is required for a particular application. The interlayer and intercoil insulating cloth preferably extends beyond the axial end faces of the coil to the desired end insulating depth. The space at each end between insulating layers is filled with a corresponding layer insulation by continuous wrapping between the two layers. The various insulating cloth sheets are preferably applied under tension and the exterior of each layer preferably rolled or otherwise worked to exclude air. The insulating cloth is also warmed slightly during the winding and working to cause the resin on the insulation material to more readily flow into the voids and crevices between the coil turns. After the formation of the coil with the interposed insulation, it is subjected to a curing and processing cycle including the heating under pressure and vacuum to cure the resin and remove all air.

In a preferred and novel construction after the winding of a coil with insulation material as described above, the exterior is preferably wrapped with a heat shrink type material such as a shrink type Mylar. The end faces of the coil are capped to confine the insulating resin during the curing and processing cycle.

The heat shrink outer layer contracts during the curing process and establishes a positive force causing the resin to flow into all of the voids and crevices and more surely excludes air from the insulation whereby a void and air free solid insulation about the windings is obtained. After the curing the Mylar wrapping is removed.

In the formation of a transformer, the steps preferably include the sequential forming of the inner winding including the curing and processing of the insulation. The major intercoil insulation is then applied, cured and processed. Thereafter, the outer winding is wound with the desired insulation in a corresponding manner and is then cured and processed in the same procedure to set the insulating material of the second winding and complete the transformer. If the transformer is not too large, the several windings and the major intercoil insulation may be wound in a single sequence with the curing and processing simultaneously provided for the completed coil.

BRIEF DESCRIPTION OF THE DRAWINGS

FIG. 4 is a schematic and diagrammatic layout of transformer windings shown in FIGS. 1 and 2 and illustrating the winding and the insulating disposition in accordance with the teaching of the present invention;

FIG. 5 is a diagrammatic illustration of a preferred method for applying the windings and the insulation in the formation of a coil;

FIG. 6 is a side elevational view of FIG. 5; and

FIG. 7 is a diagrammatic illustration showing the coil placed in a curing oven.

DESCRIPTION OF A PREFERRED EMBODIMENT

Figure 1:
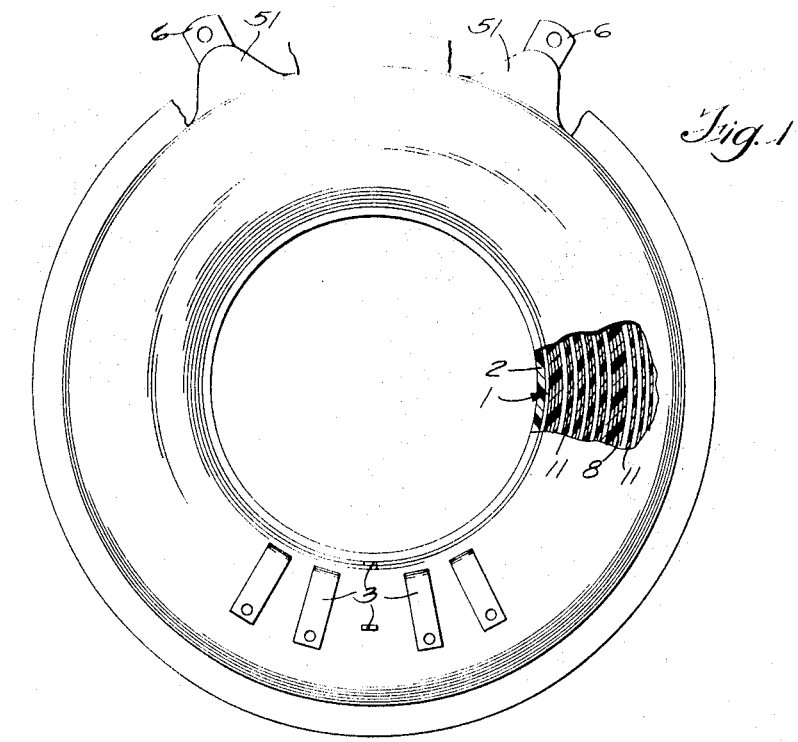
FIG. 1 is a plan view of a transformer with parts broken away to show details of construction.

Referring to the drawings and particularly to FIG. 1, the present invention is illustrated in connection with an annular or doughnut shaped transformer having an inner primary winding 1 wound on a tubular winding form 2. The primary winding 1 is a multiple layer and multiple turn winding having a plurality of primary taps and end connections 3. Superimposed in axially stacked relation about the primary winding 1 is a delta secondary winding 4 and a wye secondary winding 5. The connectors 6 for winding 4 project laterally or radially from the periphery of the transformer and similar connectors 7 project radially from the lower portion of the coil. The primary winding 1 is separated from the secondary windings 4 and 5 by a relatively heavy layer of major insulation 8. The ends of the transformer 1 and the secondary windings 4 and 5 are separated by a heavy layer of insulation 9 and 10. Additionally, the individual layers of coil turns are separated from each other by interlayer insulation 11 of a varying thickness and the periphery is sealed by a layer of insulation 12. The insulation 8 through 12 is fused to form a solid, integral mass which completely encapsulates the coils or windings.

Referring particularly to FIG. 4, the diagrammatic illustration of the winding layout is shown for purposes of illustrating the winding construction of the transformer and the method of forming such transformer.

The several windings or coils are wound about the central tubular winding form 2 which corresponds in length to the completed transformer. One or more layers of an insulating sheet 13 is wound about the form 2. The insulating sheet 13, and all the subsequent tapes and sheets of insulating described, are a non-woven cloth which is pre-impregnated with a semi-cured epoxy resin. The resin content was approximately 40 percent by weight. Such an insulating tape is manufactured and sold under the trademark "Scotchply" by Minnesota Mining and Manufacturing Company. In an actual construction, a single layer of insulating tape 13 corresponding to the heights of the form 2 and of a 20 mill thickness was employed. The first primary coil layer 14 is wound upon the tape covered form 2 as a plurality of immediately adjacent convolutions.

Figure 2:
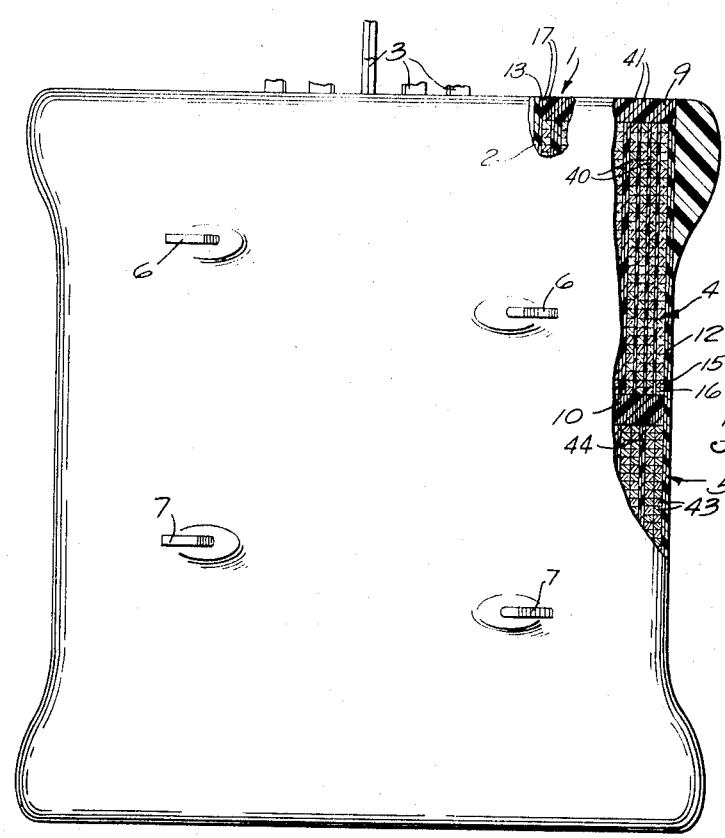
FIG. 2 is a side elevational view of the transformer shown in FIG. 1 with parts broken away to show details of construction.

Referring particularly to FIG. 2 in an actual construction, each turn was formed of a pair of immediately adjacent square conductors 15 and 16 for convenience and ease of winding. The conductors 15 and 16 are disposed in immediately adjacent axial side by side relationship and spirally wound upon the tape 13 to form the multiple turn layer 14. The initial turn is spaced downwardly from the upper end of the coil form 2, shown to the left in FIG. 4, and the last turn is correspondingly spaced from the lower end of the coil form 2.

The coil turns of layer 14 may be individually wrapped with insulation, not shown, with the total length dimension generally corresponding to all of the other layers as hereinafter described. After the winding of the first multiple layer 14 is completed, the end spaces adjacent the opposite end coil turns of the first coil 14 are filled with an insulating tape 17. For example, in an actual construction, the coil form 2 extended approximately 1 inch beyond the end turns of the coil layer 14. The space was filled with a suitable tape wrapped around both ends.

Two superimposed sheets or layers 18 of insulating cloth are then applied over the first coil layer 14. As previously described with respect to FIGS. 1 and 2, the first coil layer 14 of the primary is tapped to provide the several primary tap connections 3. In the illustrated embodiment of the invention, the insulating sheets 18 include appropriate axially spaced openings 19 in alignment with the proper coil turn to produce the desired voltage tap. The several openings 19 are also circumferentially spaced to permit interconnection of the several taps 3. The taps 3 are shown superimposed in FIG. 4 in accordance with the usual convention.

The connectors 3 may be in any desired manner such as a flat contact strip extending downwardly adjacent the outer surface of the insulating sheets 18, with the innermost end brazed or otherwise connected to the adjacent coil turns of layer 14. The connections 3 are preferably wound with a plurality of layers of an insulating tape.

A second layer including a pair of insulating sheets 24, generally corresponding to sheets 18, is wrapped about the coil and tapped connections. The second coil layer 25 is then reverse wound on the first coil layer 14, that is from the lower end of the coil, shown to the right in FIG. 4, upwardly with the uppermost turn terminating in alignment with the uppermost turn of the first coil layer 14. The winding turns may be formed from an integral conductor with the interconnection 26 extending through a suitable edge slot and openings 27 provided in the insulating sheets. In the transformer constructed, the first coil layer included 35 turns with the turns gapped to extend the winding over 22 inches of the 24 inch length of tube form 2. Generally, the wrapping of the individual turn of layer 14 with insulation 15 accounted for the additional space of such turns. The second coil layer 25 and all subsequent coil layers were wound with 40 coil turns, such that they constituted essentially a solid copper conductor throughout the 22 winding inches.

After the winding of the second coil layer 25, the end spaces are filled with the suitable size insulating tape to extend the insulation outwardly to the end face of the form 2. The second coil layer 25 is covered with insulating sheets 28 similar to that for layer 14. Additional coil layers 29 and a final coil layer 30 are successively similarly applied and wrapped with insulating sheets with the outer end spaces being filled with the filler insulating tape. In the illustrated embodiment of the invention, a total of six layers are shown with the outer most layer having its end terminating in the upper plane of the transformer and having the lead 3 extend outwardly to define the opposite end of the coil connection.

In preferred construction, the last five turns of the primary coil layer 30 are individually wrapped with a tape similar to the wrapping of the initial turns of the first coil layer 14.

Although the winding of the coil turns and the applying of the insulating tape and sheets may be in any suitable manner, a preferred method is diagrammatically shown in FIGS. 5 and 6. Each insulating sheet is applied through a suitable tension means 31 to securely wrap each layer of insulation upon the adjacent coil layer. Additionally, a heat source 32, such as a suitable heat lamp, is applied to soften the resin in the insulating tape and sheets and thereby transform the resin into a flowable state such that the resin will tend to flow into and fill the voids and crevices. Additionally, each layer of insulation is rolled or worked onto the adjacent coil layer as by a roller 33 as it is applied to remove all significant amount of air from between the layers and the adjacent member.

After the winding of the final coil layer 30, the assembly is removed from the winding apparatus and one or more layers of a heat shrink tape or sheet 34 such as Mylar is wrapped about the outer peripheral surface, as shown in FIG. 7.

The Mylar may be a 2-mill film type commercially available under the trademark "Scotch-lite."

End caps 35 and 36 are secured to the opposite end faces of the primary winding or coil in clamping engagement with the end faces of the coil to confine the insulating resin within the coil. The Mylar wrapped and capped assembly is disposed within a suitable curing apparatus 37 and subjected to an appropriate curing cycle including heat, pressure and vacuum in accordance with well-known procedure. The heating of the assembly causes the heat shrink Mylar to contract and thereby forces the resin to flow into all voids and crevices, resulting in a solid, void free insulating mass. After completion of the curing process the end caps 35 and 36 and the Mylar cover 34 are removed.

The cured insulated primary coil 1 is reassembled with the wrapped apparatus.

Major intercoil insulation 8 is then applied to the outer periphery of the cured primary. In the practical construction, 25 layers of 20 mill Scotchply cloth sheet 38 wrapped about the primary to define approximately ½-inch thick major insulation.

The several layers 38 are wrapped onto each other as diagrammatically shown in FIGS. 5 and 6 to maintain tension on the individual layers while they are simultaneously subjected to heat of source 32 and a roller working of roll 33 to remove air and the like.

The assembly is then again removed and placed in the curing apparatus 37 and the insulation layers 38 subjected to the same curing process to define a solid mass of major insulation 8 which in turn blends and bonds to the outer periphery of the primary coil 1.

The cured assembly is then again applied to the wrapping apparatus to receive the secondary windings 4 and 5, the coil turns of which are disposed in stacked relation as shown in FIGS. 2 and 4.

The delta winding 4 is started at the top with the initial turn generally aligned with the top turns of the several coil layers of the primary winding or coil 1. Each coil turn is formed from a pair of conductors generally similar to the primary winding 1. The first and last three turns of the delta winding are preferably individually wrapped with insulating tape which may be similar to the individual wrapping of the individual turns of the first primary coil layer 14. A single layer of tape was applied between each of the coil layers.

Figure 3:
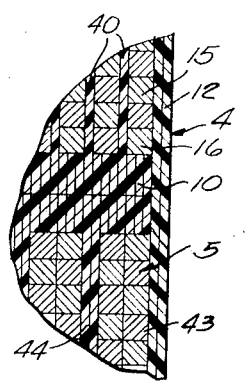
FIG. 3 is an enlarged, fragmentary view of FIG. 2 more clearly showing insulation in a portion of the transformer shown in FIGS. 1 and 2.

The delta winding 4 of the transformer constructed spanned 50 percent of the depth of the transformer. Each coil layer 39 was wound with 16 turns and six coil layers 39 were provided. Each coil layer 39 was concentrically wound with the opposite end turns spaced respectively from the outer end or top face of the finished transformer and from the center of the transformer and thus from the wye winding 5. The coil layers 39 were separated by a sheet of insulation 40 and the end spaces to the opposite ends of the coil turns were similarly filled with suitable insulation tape 41, as shown in FIGS. 2 and 3 and more specifically described with respect to the primary.

The delta winding spanned approximately 9½ inches and was spaced inwardly from the outer face approximately 1½ inches and from the center of the assembly approximately one-half inch. A 1½ inch 20-mill Scotchply tape 41 was applied to the outboard end of the delta winding and a ½-inch 20-mill Scotchply tape 41 was applied to the inboard end of the winding to fill the adjacent space and maintain a continuous insulating tape filler to the opposite end of the winding.

The wye secondary winding 5 is similarly applied to the lower half of the transformer. The wye winding includes three coil layers 42. The diagrammatic illustration of FIG. 4 shows a substantial void between the outermost layer and the outer surface of the transformer. In fact, each coil layer includes a double radial layer of conductors 43, as shown in FIGS. 2 and 3, such that each coil turn includes four conductors arranged in four quadrants to define a square multi-conductor for each turn. Each coil layer 42 will generally correspond to two of the coil layers of the delta winding and the radially extension will correspond to that of the delta winding.

Additionally, the coil layers 42 of the wye winding 5 are separated by a double layer of insulation 44. In the actual transformer construction, the winding was spaced from the center of the assembly by approximately one-half inch and spanned approximately 10½ inches thereby spacing the lowermost turns from the outer face by approximately 1½ inches. The end spaces were filled by ½-inch by 20-mill tape 45 and a 1½ inches by 20-mill tape 46, similar to the delta winding.

After the formation of the delta winding 4 and the wye winding 5 a double layer of insulating sheets 47 of a full depth is applied about the secondary winding.

Stress cone insulation 49, as shown in FIG. 2, may be applied to the top and bottom by wrapping a plurality of layers of insulating tape 8 about the upper and lowermost ends of the coil. For example, the upper and lower 5 inches of the peripheral surface of the 24-inch high transformer which has been described herein was formed with a stress cone. The stress cone was formed by 2-inch by 20-mill tape with an overlap wrapped to define the thickness to the outermost ends.

Three layers of heat shrink Mylar 50 are then applied about the completed windings with the connecting end of the several windings extending outwardly through the tape insulation and the heat shrink Mylar. The assembly is removed from the winding apparatus and end caps 35 applied to again confine the insulating resin.

The assembly is placed in the curing apparatus 37 and is subjected to the heat, pressure and vacuum in accordance with known procedures to completely cure the resin. Once again, the shrinking of the outer Mylar tape causes the resin to flow into all the voids and crevices and thereby insures a solid and continuous insulation. The stress cone areas are then ground to a suitable radius to complete the transformer.

The several primary taps 3 and secondary connectors 6 and 7 may be wrapped with a suitable tape or other insulating material 51 to define integral stress cones for removing the high voltage stress from the point of termination and thereby minimizing or eliminating corona on the external surface.

The transformer constructed in accordance with the present invention has been found to provide a highly reliable and effective high voltage insulation.

Although the curing step for the primary and secondary windings as well as the major insulation has been described as individual sequential steps, they may be simultaneously provided if the construction and the curing apparatus permit.

A transformer constructed in accordance with the illustrated embodiment of the invention has advantageously been employed in a high voltage direct current power supply for a plasma arc process. A three phase transformer was employed with each of the phases provided by a transformer as shown in the drawings.

The particular embodiment of the invention set forth above including the particulars of the number of turns, spacing of coils, insulating layers and the like are for the purposes of clearly explaining one structure. Such detail as spacing, thickness and number of insulating layers and the like will be reorganized as being a function of voltage levels and consequently will of course change with the particular application to which the present invention is applied.

Although described in connection with the transformer, a single coil or winding for any other application can advantageously be constructed in accordance with the present invention.

The present invention provides a high voltage totally capsulated inductive coil which can be formed essentially without limitation as to physical size and voltage limitations.

We claim:

1. The method of insulating an inductive coil including the steps of forming at least one conducting coil layer, applying a cloth material preimpregnated with a curable resin about said layer to define an insulating layer, applying a lateral force to the outer surface of the insulating layer during the application of same to the coil layer to physically work the cloth material and cause impregnation of said coil layer by said resin thereby excluding air and voids from said coil layer, and heating the material to soften the uncured resin and cause it to flow into the coil layer.

2. The method of claim 1 wherein said coil includes encapsulating insulation of said cloth material and terminal means projecting outwardly of said insulation, and including the step of forming a stress cone about the terminal means and integral with the encapsulating insulation to reduce dielectric stress concentration.

3. The method of claim 1 including the steps of wrapping a heat shrink cover about the insulating layer, and heating said wrapped coil thereby causing said cover to shrink and force said resin into voids and crevices within the conducting coil layer.

4. The method of claim 1 wherein said cloth material is a cloth sheet and wherein said physical working includes the further step of applying tension to each sheet as it is wrapped about each coil layer.

5. The method of claim 4 wherein the physical working of the cloth material includes the step of rolling a cylindrical member upon the outer surface of the insulating layer.

6. The method of claim 1 including the steps of forming additional interconnected conducting coil layers concentrically about the first coil layer, applying a cloth material as an integral sheet impregnated with the resin about each layer, wrapping the periphery with a heat shrink material and thereafter heating said coil and material to cure said resin, and removing said heat shrink material.

7. The method of claim 1 wherein a plurality of concentric multiple layer windings are formed with a heavy intercoil insulation therebetween and including the steps of winding a plurality of superimposed layers of said cloth material about the processed coil to define said intercoil insulation, heating said coil and superimposed layers to cure the resin in the intercoil insulation, winding additional interconnected coil layers concentrically about the intercoil insulation and applying said nonwoven cloth material about each layer and about the outermost layer, and wrapping a heat shrink material about said outermost insulating cloth, heating the wrapped assembly to cure the resin and shrink said heat shrink material, and removing the heat shrink material.

8. The method of claim 1 wherein said method includes the steps of forming a self-supporting winding tube of a nonwoven glass filament cloth impregnated with a semi-cured epoxy resin, wrapping a glass filament film-like cloth impregnated with a semi-cured resin about said tube, winding a first coil layer upon said film-like cloth with end-turns spaced inwardly from the tube ends to define end insulating spaces, wrapping a tape of said film-like cloth about the tube to fill said end insulating spacing, and forming succeeding concentric winding layers by successive wrapping said film-like cloth of a depth corresponding to said winding tube depth about the preceding coil layer and the succeeding coil layers upon said cloth, wrapping the winding with a heat shrink cover to force the resin into voids and the like within the coil.

9. The method of claim 1 wherein said method includes the steps of forming a self-supporting winding tube of an insulating material, wrapping film-like sheets of the cloth material about said tube impregnated with a thermoset resin, winding a first coil layer upon said film-like sheet with end-turns spaced inwardly from the tube ends to define end insulating spacing, and forming succeeding concentric winding layers by successive wrapping said film-like cloth material of a depth corresponding to said winding tube depth about the preceding coil layer and the succeeding coil layers upon said cloth, and filling the end insulating spaces with said film-like cloth material to form a coil winding, wrapping the winding with a heat shrink cover, and heating the wrapped winding to cure the resin and simultaneously contract said heat shrink cover to force the resin into voids and the like within the winding.

10. The method of claim 9 including the step of working the film-like sheets during the application to exclude air and voids in the forming of the coil.

* * * * *